United States Patent
Bakker

(10) Patent No.: US 9,282,444 B2
(45) Date of Patent: Mar. 8, 2016

(54) METHOD AND APPARATUS FOR INTERWORKING SIP COMMUNICATION WAITING WITH CIRCUIT SWITCHING AND PACKET SWITCHING NODES

(71) Applicant: BLACKBERRY LIMITED, Waterloo (CA)

(72) Inventor: Jan Hendrik Lucas Bakker, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 169 days.

(21) Appl. No.: 13/973,745

(22) Filed: Aug. 22, 2013

(65) Prior Publication Data
US 2014/0010118 A1    Jan. 9, 2014

Related U.S. Application Data

(63) Continuation of application No. 12/608,905, filed on Oct. 29, 2009, now abandoned.

(60) Provisional application No. 61/109,396, filed on Oct. 29, 2008, provisional application No. 61/112,729, filed on Nov. 8, 2008.

(51) Int. Cl.
*H04L 12/16*    (2006.01)
*H04W 4/16*    (2009.01)
*H04M 3/428*    (2006.01)
*H04L 29/06*    (2006.01)

(52) U.S. Cl.
CPC ............. *H04W 4/16* (2013.01); *H04L 65/1096* (2013.01); *H04M 3/428* (2013.01); *H04L 65/1016* (2013.01)

(58) Field of Classification Search
None
See application file for complete search history.

(56) References Cited

U.S. PATENT DOCUMENTS

| | | | |
|---|---|---|---|
| 2006/0116127 A1* | 6/2006 | Wilhoite et al. | 455/442 |
| 2007/0060196 A1* | 3/2007 | Sharma | 455/552.1 |
| 2009/0257418 A1* | 10/2009 | Allen et al. | 370/338 |
| 2009/0296567 A1* | 12/2009 | Yasrebi et al. | 370/221 |

* cited by examiner

*Primary Examiner* — Minh-Trang Nguyen
(74) *Attorney, Agent, or Firm* — Trop Pruner & Hu, P.C.

(57) ABSTRACT

A method and apparatus for interworking a session by a Mobile Switching Center (MSC) server enhanced for IP Multimedia Subsystem (IMS) Centralized Services (ICS), the method comprising receiving at the MSC an invite message and the MSC sending a setup message comprising an information element indicating a call waiting tone on when the invite message comprises a call waiting indication.

9 Claims, 7 Drawing Sheets

METHOD AND APPARATUS FOR INTERWORKING SIP COMMUNICATION WAITING WITH CIRCUIT SWITCHING AND PACKET SWITCHING NODES

The present application is a continuation application based on U.S. application Ser. No. 12/608,905, which was filed on Oct. 29, 2009, and which claims priority to U.S. provisional application No. 61/109,396 which was filed on Oct. 29, 2008 and to U.S. provisional application No. 61/112,729 which was filed on Nov. 8, 2008, each of which has a title identical to the title of the present application and each of which is incorporated herein in its entirety by reference.

BACKGROUND

The present patent disclosure generally relates to message processing in communications networks. More particularly, and not by way of any limitation, the present disclosure is directed to a method and system enabling a SIP Communication Waiting function in a communication network that supports both a circuit switching domain and a packet switching domain.

Hereafter, unless indicated otherwise, the phrase "user equipment" or "UE" will be used to refer to any tethered or untethered communication device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. In one embodiment, a UE device may be capable of operating in multiple modes in that it can engage in both Circuit-Switched (CS) as well as Packet-Switched (PS) communications, and can transition from one mode of communications to another mode of communications without loss of continuity. Furthermore, those skilled in the art will recognize that a wireless UE device may sometimes be treated as a combination of a separate mobile equipment (ME) device and an associated removable memory module. Accordingly, for purposes of the present disclosure, the terms "wireless device" and "UE device", which are broadly synonymous, are each treated as representative of both ME devices alone as well as the combinations of ME devices with removable memory modules as applicable. A UE contains at least one UA (User Agent). A User Agent can terminate or initiate SIP sessions. A UAC (UA Client) initiates SIP requests and UAS (UA Server) serves SIP requests and can reply with SIP responses. A SIP message (lower case) can be either a SIP request or a SIP response. IMS messages include SIP messages, XCAP messages and other messages.

For years, reliable voice communication services have been provided over circuit-switched (CS) networks. More recently, packet-switched (PS) networks (e.g., the Internet) capable of carrying data and voice communications have been developed. PS networks allow Internet Protocol ("IP") enabled devices to send and receive IP-based voice communications and data between one another over packet-switched networks such as the Internet.

Initially, voice communications over PS networks were performed independently of voice communications over CS networks. Accordingly, a person transmitting a voice communication over a PS network, for example, could send the voice communication to a PS network enabled UE connected to the PS network but not to a CS network UE connected to a circuit switched network. Technologies were later developed to bridge voice communications from PS networks to CS networks and vice versa. Accordingly, a person subscribing to a Voice over Internet Protocol ("VoIP") service could use the VoIP service to establish communications with UEs connected to CS networks. In addition, CS network carriers could bridge voice communications from a CS network to a PS network and back to the CS network to reduce the costs of transmitting the voice communications over long distances. For a time conventional end-user UEs remained limited to using independent communications for CS and PS networks. Consequently, conventional end-user UEs could not leverage cooperation between CS and PS networks.

To leverage the PS service platform while exploiting the CS infrastructure for transport of media such as voice, hybrid end-user communication devices have been configured that use PS based Session Initiation Protocol (SIP) signaling to control media, where certain media is transported in the CS (access) network (e.g. voice). Accordingly, a hybrid end-user UE may use PS based session control protocol signaling in combination with a CS network media bearer path to support e.g. voice communication. For example, a hybrid end-user UE connected to a CS network and to a PS network may use SIP signaling (or other IP based session control protocol signaling) over the PS network to establish or tear down a CS network media bearer path while using voice media services or supplementary services or simulation services in the PS network. In another example, a CS end-user UE may use the CS access network to use CS based call control in combination with a CS network media bearer path to support e.g. voice communication. For example, a hybrid end-user UE connected to a CS network may communicate with a network node which uses SIP signaling (or other IP based session control protocol signaling) over a PS network for using voice media services or supplementary services in the PS network. The hybrid UE may continue to use SIP signaling over the PS network while sending or receiving a media stream (e.g., voice communication) over a CS network media bearer path.

The combination of PS network based session control protocol signaling over a PS network and a CS network transport path for a hybrid voice communication can leverage the PS service platform while exploiting the CS infrastructure for transport of media such as voice. For example, the use of PS network based session control protocol signaling over a packet-switched network can conserve resources on the CS network while the use of a CS network media bearer path for media transport provides high quality and reliability of a circuit-switched network. In addition, hybrid, PS and CS UEs would get access to (e.g. media or voice) services hosted on the PS service platform.

Several useful call services have been developed that enhance voice communications. Two particularly useful call services include a "call waiting" feature and a "call forwarding" feature. As the label implies, when a first person uses a first UE to communicate with a second person and a third person calls the first UE, the call waiting feature provides an indication via the first UE that there is a call waiting for the first person. Typically the indication will includes short intermittent tone or buzz sound that, while discernible, does not appreciably hamper communications between the first and second persons. In response to the call waiting tone, the first user may either ignore the waiting call or may perform some process (i.e., end the current call, put a current call on hold, etc.) to free up resources so that the call can be answered. Also, as the label implies, the call forwarding feature forwards calls to a voice mail box or other resource when a UE user does not want to, is unable to or chooses to not to receive a call. For instance, when a user is in a meeting and receives a call, the user may elect to simply redirect the call (e.g. to a voice mail box or to another device or to another user) to be addressed at a later time or by someone else or using a more convenient device.

Call waiting is a CS network based service that is supported in various network technologies including the Code Division Multiplex Axis (CDMA), fixed line technologies, cable technologies, GSM/UMTS, etc. A comparable service called "communication waiting" has been developed for use on PS networks (e.g., on IP networks). In particular, a communication waiting based service has been developed for the IP Multimedia Subsystem (IMS) as a service platform for SIP based services. Unfortunately, no system currently exists that enables call waiting or Communication Waiting services when a user is subscribed to or is configured to use a call or communication waiting service controlled through the PS network where the user's UE is either a hybrid UE or a CS UE.

With respect to the call forwarding service, currently call forwarding service operates such that, when a call is received that a user does not want to answer at the time it is received, the user can select a button on a UE or the like to forward the call to a voice mail account or the like thereby causing the UE to stop ringing or stop generating a call waiting or communication waiting tone. In other cases a UE user may be able to configure the UE or a subscription account to redirect all calls (e.g. to a voice mail address or the like) either immediately upon reception or after a given time corresponding to a minimal number of UE rings or CW tones (e.g., two) or for other reasons. Here, a UE user that does not want to be disturbed by calls during a period may desire to minimize the duration of the ringing or CW tone period to minimize disturbance associated with incoming calls. However, from the perspective of a session initiator (i.e., the person initiating a call), often when a call is quickly redirected to voice mail, the perception is that the person being called does not value the communication.

Figure 1:
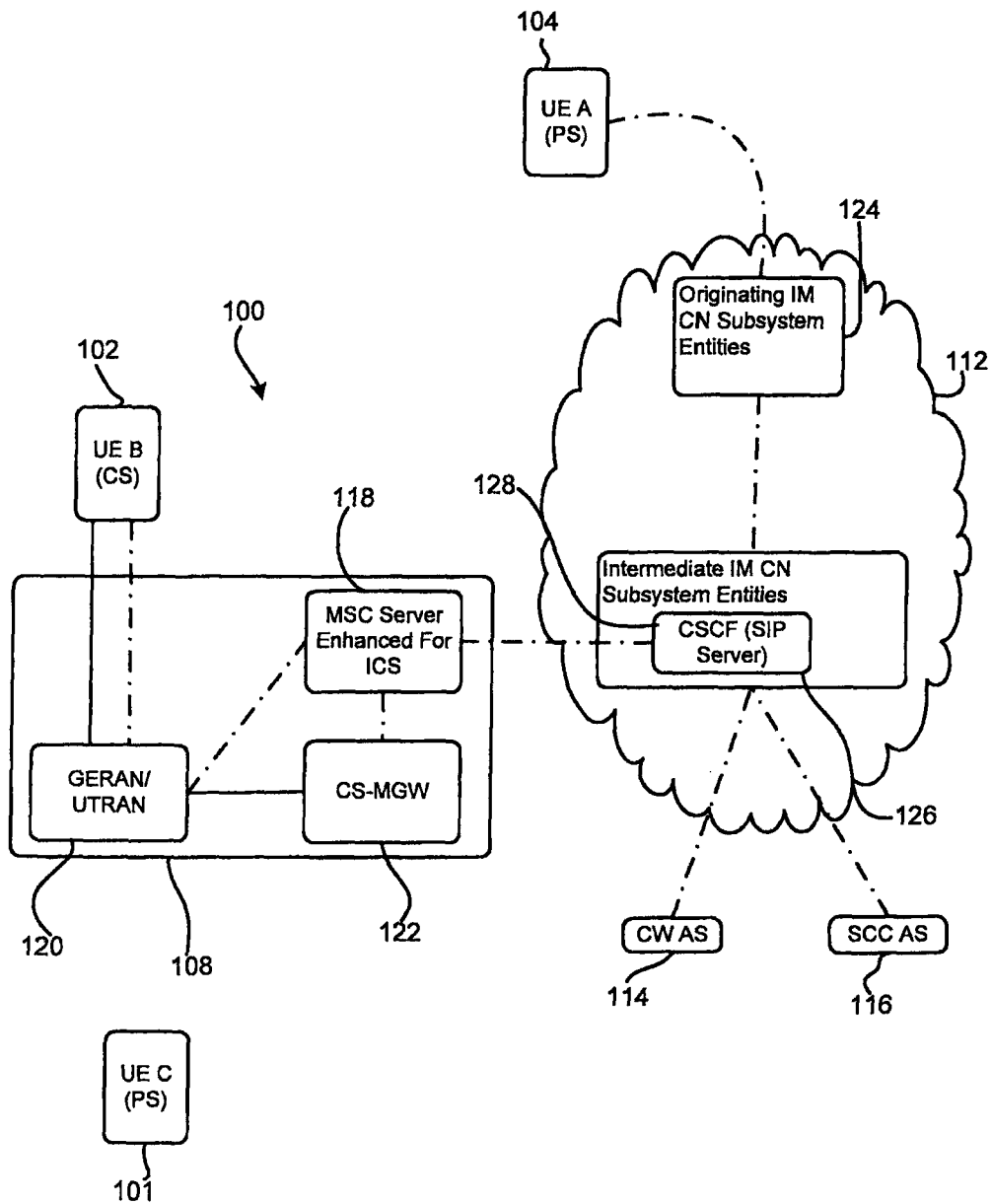
FIG. 1 is a schematic diagram illustrating a communication system that may be used to perform various aspects of the present disclosure.

While the disclosure is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the disclosure is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some embodiments include a method for interworking a session by a Mobile Switching Center (MSC) server enhanced for IP Multimedia Subsystem (IMS) Centralized Services (ICS), the method comprising receiving at the MSC an invite message and the MSC sending a setup message comprising an information element indicating a call waiting tone on when the invite message comprises a call waiting indication.

In some cases the MSC stores an indication that the session includes a call waiting application server when the invite message comprises the call waiting indication. Some cases further include the steps of, if said indication that the session includes a call waiting application server is stored, receiving a response indicating that the UE does not support the communication waiting service to a UE that initiated said invite message and, where said UE involved in a first call does not support the communication waiting service, transmitting an unsupported media type response.

Some cases further include the steps of, if a timer expires, (i) receiving a response, the response indicating #19 (user alerting, no answer) or #18 (no user responding), mapping the response to the 408 (Request Timeout) final response including a Reason header field with a protocol set to "Q.850" and a cause set to "19" or "18", respectively; or (ii) clearing the call and sending a response to the INVITE message. In some cases the response to the INVITE message is a final response prior to expiry of any timers associated with service logic in at least one of a Communication Waiting (CW) and a Communication Diversion (CDIV) application server. In some cases the method further includes the steps of receiving a request with a Reason header field with the protocol set to "SIP" and the cause set to "408"; and sending the first clearing message with the Cause information element set to cause #102 "recovery on timer expiry".

Some embodiments include a method for interworking a session by a Mobile Switching Center (MSC) server enhanced for IP Multimedia Subsystem (IMS) Centralized Services (ICS), the method comprising receiving at the MSC an invite message, the MSC sending a setup message, receiving a response message at the MSC and when the response message comprises a call waiting indication, the MSC sending an alerting message comprising a carrier message for the Call Waiting notification.

Other embodiments include a method for interworking a session by a Mobile Switching Center (MSC) server enhanced for IP Multimedia Subsystem (IMS) Centralized Services (ICS), the method comprising sending at the MSC an invite message, receiving a response message at the MSC and when the response message comprises a call waiting indication, the MSC sending an alerting message comprising a carrier message for the Call Waiting notification.

Still other embodiments include a method for interworking a session by a Mobile Switching Center (MSC) server enhanced for IP Multimedia Subsystem (IMS) Centralized Services (ICS), the method comprising receiving at the MSC an invite message and the MSC generating a SIP 415 ((Unsupported Media Type) response when the Communication Waiting or call waiting service is at least one of not supported, not allowed, and not subscribed to.

Other embodiments include a method for facilitating a supplementary service within a network including nodes, the method comprising the steps of providing a server configured to maintain a timer monitoring a condition, monitoring for a first clearing message, upon expiry of the timer, transmitting at least one second clearing message and allowing the timer to expire when a first clearing message indicating the condition is received.

Some embodiments include an apparatus for interworking a session by a Mobile Switching Center (MSC) server enhanced for IP Multimedia Subsystem (IMS) Centralized Services (ICS), the apparatus comprising, an MSC server configured to perform the steps of, receiving an invite message and sending a setup message comprising an information element indicating a call waiting tone on when the invite message comprises a call waiting indication.

In some cases the MSC server is further configured to perform the step of storing an indication that the session includes a call waiting application server when the invite message comprises the call waiting indication. In some cases the MSC server is further configured to perform the step of, if said indication that the session includes a call waiting application server is stored and receiving a response indicating that a UE does not support the communication waiting service to a UE that initiated said invite message and, where said UE involved in a first call does not support the communication waiting service, transmitting an unsupported media type response.

In some cases the MSC server is further configured to perform the steps of, if a timer expires, (i) receiving a response, the response indicating #19 (user alerting, no answer) or #18 (no user responding), mapping the response to the 408 (Request Timeout) final response including a Reason header field with a protocol set to "Q.850" and a cause set to "19" or "18", respectively; or (ii) clearing the call and sending a response to the INVITE message. In some cases, where said response to the INVITE message is a final response prior to expiry of any timers associated with service logic in at least one of a Communication Waiting (CW) and a Communication Diversion (CDIV) application server. In some cases the MSC server is further configured to perform the steps of receiving a request with a Reason header field with the protocol set to "SIP" and the cause set to "408" and sending the first clearing message with the Cause information element set to cause #102 "recovery on timer expiry".

Some embodiments include an apparatus for interworking a session by a Mobile Switching Center (MSC) server enhanced for IP Multimedia Subsystem (IMS) Centralized Services (ICS), the apparatus comprising, an MSC server configured to perform the steps of, receiving an invite message, sending a setup message, receiving a response message and when the response message comprises a call waiting indication, sending an alerting message comprising a carrier message for the Call Waiting notification.

Other embodiments include an apparatus for interworking a session by a Mobile Switching Center (MSC) server enhanced for IP Multimedia Subsystem (IMS) Centralized Services (ICS), the apparatus comprising, an MSC server configured to perform the steps of, sending an invite message, receiving a response message and when the response message comprises a call waiting indication, sending an alerting message comprising a carrier message for the Call Waiting notification.

Some embodiments include an apparatus for interworking a session by a Mobile Switching Center (MSC) server enhanced for IP Multimedia Subsystem (IMS) Centralized Services (ICS), the apparatus comprising an MSC server configured to perform the steps of receiving an invite message and generating a SIP 415 ((Unsupported Media Type) response when the Communication Waiting or call waiting service is at least one of not supported, not allowed, and not subscribed to.

Still other embodiments include an apparatus for facilitating a supplementary service within a network including nodes, the apparatus comprising an MSC server configured to perform the steps of, maintaining a timer monitoring a condition, monitoring for a first clearing message, upon expiry of the timer, transmitting at least one second clearing message and allowing the timer to expire when a first clearing message indicating the condition is received.

In some embodiments the present disclosure is broadly directed to a communication system and method whereby Communication Waiting and call waiting services are supported in hybrid packet switched (PS) and circuit switched (CS) networks where some UEs are capable of communicating via the PS domain and other UEs are not. In at least some embodiments a Mobile Switch Center (MSC) that forms part of a CS network is enhanced to support IP Multimedia Subsystem (IMS) messages and to, in effect, translate CS and/or radio bearer control signals to corresponding sets of IMS messages, and vice versa where the messages and control signals specifically support Communication Waiting services and Communication Diversion services. In some embodiments a UE is capable of supporting call waiting, call forwarding, and Communication Diversion and Communication Waiting services.

Referring now to the drawings, and more specifically to FIG. 1, an exemplary distributed network environment 100 is depicted wherein the network environment 100 includes multiple entities or nodes (i.e., endpoints as well as entities intermediate therebetween) for purposes of effectuating various telecommunications services. Exemplary endpoints comprise User Equipment (UE) devices UE C 101, UE B 102, UE A 104 that are coupled to a core network infrastructure 112 by means of suitable access networks such as CS network 108. UEs 101 and 102 are CS network UEs which means that they communicate via a CS network and not via the PS network. UE A 104 is capable of PS communications and may also be capable of CS communications.

The access networks may collectively be deemed as an access space comprised of a number of access technologies available to UE devices 101, 102, 104. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. In one embodiment, a UE device may be capable of operating in multiple modes in that it can engage in both Circuit-Switched (CS) as well as Packet-Switched (PS) communications, and can transition from one mode of communications to another mode of communications without loss of continuity. Furthermore, those skilled in the art will recognize that a wireless UE device may sometimes be treated as a combination of a separate mobile equipment (ME) device and an associated removable memory module. Accordingly, for purposes of the present disclosure, the terms "wireless device" and "UE device", which are broadly synonymous, are each treated as representative of both ME devices alone as well as the combinations of ME devices with removable memory modules as applicable.

The access space comprising the access networks may include CS networks (like network 108), PS networks, or both, which may involve wireless technologies, wireline technologies, broadband access technologies, etc. For example, wireless technologies may include Global System for Mobile Communications (GSM) networks and Code Division Multiple Access (CDMA) networks, as well as any 3rd Generation Partnership Project (3GPP)-compliant cellular network (e.g., 3GPP or 3GPP2). Broadband access networks may include wireless local area networks or WLANs, Wi-MAX networks as well as fixed networks such as Digital Subscriber Line (DSL), cable broadband, etc. Thus, for purposes of the present disclosure, the access technologies may comprise radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), and Universal Mobile Telecommunications System (UMTS) technology, and Evolution—Data Optimized (EVDO) technology, and their successors such as Long Term Evolution (LTE), and so on. Additionally, the access networks may also include the conventional wireline PSTN infrastructure in some implementations.

Exemplary CS network 108 includes a Mobile Switching Center (MSC) server enhanced for IP Multimedia Subsystem (IMS) Centralized Services (ICS) 118, a Circuit Switched Media GateWay (CS-MGW) 122 and a Global system for global communication Edge Radio Access Network/Universal mobile Telecommunication System Terrestrial Radio Access Network (GERAN/UTRAN) 120 or another access network part of the access space. Here, in at least some embodiments enhanced MSC server 118 is configured to translate CS and/or bearer control signals to corresponding sets of IMS messages and vice versa. Thus, for instance, where the CS network is a UMTS/GSM system, MSC server 118 is programmed to translate between UMTS/GSM CS messages and IMS messages. For example, where a SIP INVITE message is received from a UE A 104 intended for UE B 102, MSC server 118 generates and transmits a CS SETUP control signal associated therewith to UE B 104 as will be described in greater detail below. As another example, where a CONNECT or a CALL CONFIRMED signal is received from UE B 104, MSC server 118 generates a SIP message in response thereto that is then transmitted to the UA that initiated a SIP INVITE to facilitate communication. Similarly, where the CS network is based on CDMA technology, MSC 118 is programmed to translate between CDMA CS messages and IMS messages.

Network infrastructure 112 may comprise an IP Multimedia Subsystem (IMS) core layer as well as a services/applications layer. As is well known in the art, the IMS core 112 is defined by the standards set forth by the 3GPP body that are designed to allow service providers manage a variety of services to be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), PTT-over-Cellular (PoC), or other IMS Centralized Services (ICS) service, etc. Examples of Application Servers (AS) are Communication Diversion Application Server (CDIV AS), Call Waiting Application Server (CW AS) 114, Service Centralization and Continuity Application Server (SCC AS) 116, etc. IMS manages applications by defining common control components such as subscriber profiles, IMS mobility, network access, authentication, service authorization, charging and billing, inter-operator functions, and interoperation with the legacy phone network.

It should be understood that whereas IMS is defined by the 3GPP standards body that mainly addresses GSM networks, another group, 3GPP2, is involved in defining a closely analogous architecture referred to as Multimedia Domain (MMD). MMD is basically an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Referring still to FIG. 1, reference numerals 124 and 126 each refers to one or more IP Multimedia Core Node (IM CN) subsystem entities that comprise the core PS network infrastructure. By way of illustration, entities 126 may exemplify Proxy-Call Session Control Function (P-CSCF) nodes, Serving-CSCF or S-CSCF nodes, Interrogating-CSCF or I-CSCF nodes, Breakout Gateway Control Function (BGCF) nodes, Interconnection Border Control Function (IBCF) nodes, Media Gateway Control Function (MGCF) nodes, Home Subscriber Server (HSS) nodes, and the like. In FIG. 1 exemplary entities 126 are shown as comprising a Call Session Control Function (CSCF) 128.

As alluded to previously, entities 124 and 126 as well as endpoint UE A 104 employ SIP as a communication protocol for session control, i.e., setting up and tearing down communication sessions. Accordingly, the network nodes and the UE A 104 may collectively be referred to as "SIP entities", or more generally, "communication protocol entities", that engage in sending and receiving suitable communication protocol messages (e.g., SIP messages) for effectuating various services, e.g., VCC, PTT, PoC, Emergency Services, etc.

Each SIP entity is typically provided with a User Agent (UA) that may operate in two fashions: (i) User Agent Client (UAC) that generates request messages towards servers; and (ii) User Agent Server (UAS) that receives request messages, processes them and generates suitable responses. In some application scenarios, a single UA may function as both at a SIP entity, e.g., a UE device or a network node. In the most basic form, SIP uses six types (methods) of requests:

INVITE: Indicates a user or service is being invited to participate in a call session.
ACK: Confirms that the client has received a final response to an INVITE request.
BYE: Terminates a call/session and can be sent by either the caller or the callee.
CANCEL: Cancels any pending searches but does not terminate a call/session that currently in progress.
OPTIONS: Queries the capabilities of servers.
REGISTER: Registers the address listed in the To: header field with a SIP server.

Figure 2:
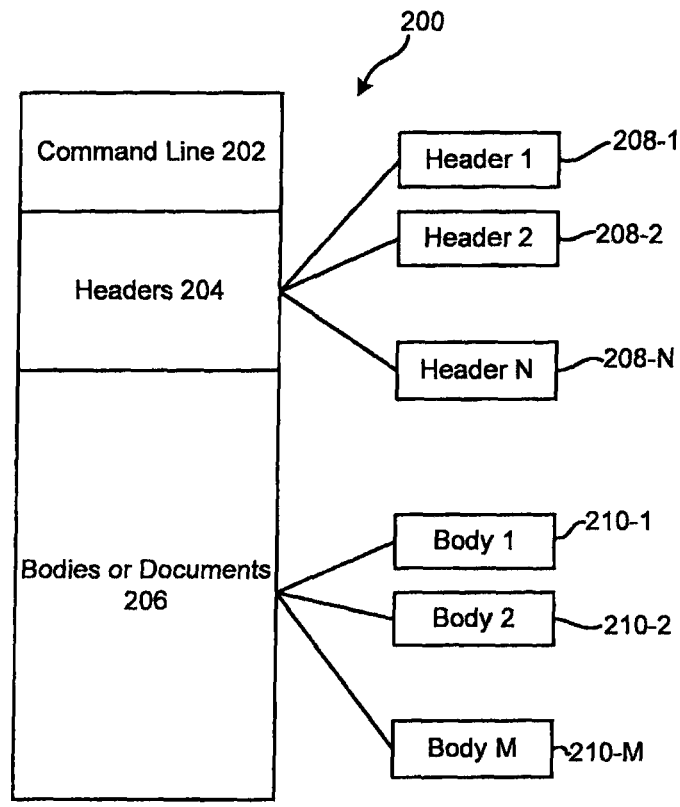
FIG. 2 is a schematic diagram of an exemplary SIP message that is consistent with at least some aspects of the present disclosure.

SIP messages are typically provided with a standardized message structure consisting of SIP message elements. FIG. 2 depicts the structure of an exemplary SIP message 200 having the following SIP message elements: one initial line, one or more header fields, and a message body, where the message body possibly includes multiple body parts. A command line portion 202 identifies the initial line (e.g., a request line in requests and a status line in responses). A header portion 204 identifies one or more header fields 208-1 through 208-N that convey various pieces of information. One or more message bodies 210-1 through 210-M may be provided in a message body portion 206. As is well known, a message body is operable to hold any content such as plain text, coded images, or any information that may be rendered, e.g., in a Markup Language such as XML, HTML, etc. Each message body (or body part) is described using header fields such as, but not limited to, Content-Disposition, Content-Encoding, and Content-Type, etc., which provide information on its contents. Typically, the value of a Content-Type header field is a Multi-purpose Internet Mail Extensions (MIME) type.

Where a Markup Language is used for describing message contents, such a message body may also be referred to as a document. Such a document conforms to a schema document. Each schema can produce one or more document instances or documents or instances. SIP-based applications, including the session control applications for communications services implemented in a communications network such as the network 100 shown in FIG. 1, increasingly rely on XML documents to exchange data and/or other information. In general, various SIP entities may communicate with each other using XML documents as a common data interchange language for effectuating communication sessions, Business-to-Business (B2B) and Business-to-Consumer (B2C) applications, etc. Additionally, technologies such as web servers, servlets, web applications, web services, and the like also generally rely in some fashion on data organized according to the XML Specification.

XML is a subset of a family of Standardized General Markup Languages (SGML) and is standardized by the W3 Consortium. As such, XML is a hierarchical set of entities wherein an entity may contain one or more elements. Each element comprises an opening label or tag, text, and a closing label or tag. Typically, elements also contain one or more attributes that operate to modify information contained in the elements. As a descriptive language to describe information or data passed between nodes, XML is provided with certain syntax rules such as, e.g., (i) XML documents must have a root element; (ii) XML elements must have a closing tag; (iii) XML tags are case sensitive; (iv) XML elements must be properly nested and/or ordered; (v) XML attribute values must be quoted, and so on. An XML file with correct syntax is called a "well formed" XML file.

Because of extensibility (which allows any author to define their own application-specific elements, attributes, etc.), an XML document may exist in multiple variations, yet a recipient may still only be configured to use a subset of elements and attributes present in the various possible variations. To facilitate document compatibility between multiple nodes, certain meta-level structure or "schema" that is relevant to a particular document type is implemented at the transacting nodes. The various meta-level structures or "schemas" defining the sets of possible XML instance documents can be indicated. This indicator can be used by the sending node of the transacting nodes to identify the sets the XML instance document is a member of. A receiving node of the transacting nodes can use the indicator to identify another component (e.g., part of message body (or body part)-specific layer) that can semantically and/or syntactically handle the received element of set of XML documents it is known to handle.

An XML schema may therefore be thought of as a definition of the structure, organization, and data types that are acceptable in corresponding XML documents. The XML schema further defines a set of XML elements, XML element attributes, and organization among the XML elements that is desired, whereby the XML schema serves as a vocabulary for the XML elements. Furthermore, since the schemas themselves are based on XML, they may also be extended and may exist in multiple versions. Because of extensibility (which allows any author to define their own application-specific elements, attributes, etc.), an XML schema document identified using the same identifier or media type may exist in multiple variations.

To facilitate document compatibility between multiple nodes, common/certain meta-level structure or "schema" that is relevant to a particular document type is implemented at the transacting nodes. In some XML implementations, a Document Type Definition (DTD), XML Schema, NGRelax, or a Document Content Definition (DCD) or other XML schema, may be provided to define a set of rules with respect to the meta-structure of an XML file. Another implementation is to provide an XML-based alternative (i.e., an XML schema) to DTDs, for example, XML Schema, NGRelax, or other. The XML Schema language is also sometimes referred to as XML Schema Definition (XSD). A component that applies a XML schema uses it typically for validating an XML document. Accordingly, a "valid" document is a "well formed" document which also conforms to the rules of a XML schema(s) that is/are supported by the transacting nodes.

With respect to SIP messages in an IMS network environment, applicable standards (e.g., 3GPP TS 24.229 "IP multimedia call control protocol based on Session Initiation Protocol (SIP) and Session Description Protocol (SDP)"; Stage 3 (Release 8)) provide that the MIME type associated with an XML message body is "application/3gpp-ims+xml". Typically, the XML schema used (or a compatible version) to generate the body or body part is also needed by the recipient in order to validate the body or body part. Otherwise an invalid XML document may lead to unpredictable behavior or erroneous results with respect to a requested telecommunications service. Furthermore, if a sender's XML message bodies are not accepted by a recipient's validator due to a lack of compatibility (forward or backward), significant interoperability issues can arise in the communications environment.

Figure 3:
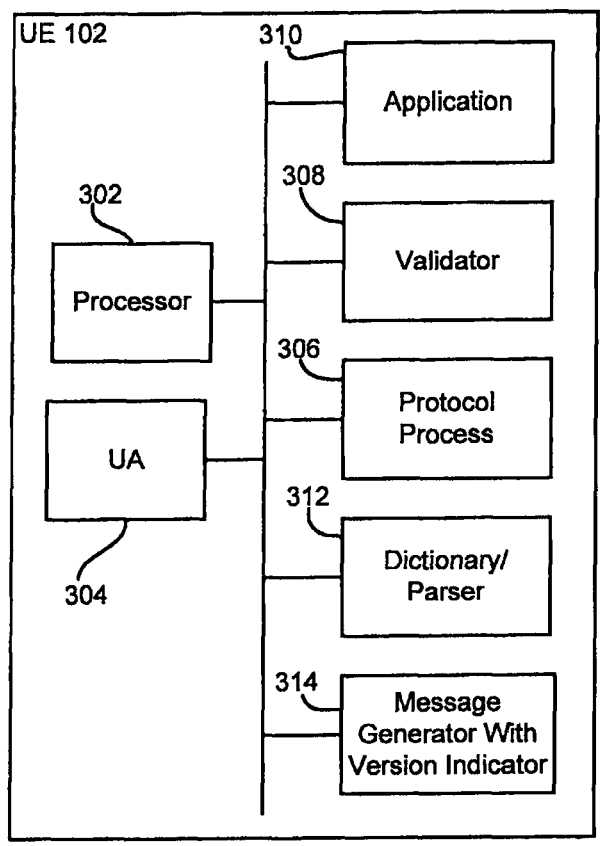
FIG. 3 is a schematic diagram of an exemplary PS domain UE according to one embodiment where the UE is operable as a SIP entity capable of processing XML message bodies.

Referring now to FIG. 3, a block diagram of exemplary PS domain UE A 104 according to an embodiment that is operable as a SIP entity capable of processing XML message bodies is shown. One or more processing entities 302 are provided for the overall control of various processes executable on the device. A User Agent 304 is operable either as a UAS or a UAC with respect to a communication protocol process such as a SIP process. Reference numeral 306 refers to an exemplary protocol process module. A validator 308 is operable to validate XML documents, for example, received in a SIP message body. Validator 308 may also be used to generate XML documents of a particular version and possibly include a document version in the document. An application 310 is operable to execute or invoke suitable software based on the contents of the XML message documents. A dictionary and parser 312 may also be provided with respect to message parsing. A message generator 314 operable in conjunction with applicable protocol processes is included that is also capable of providing an indicator such as, e.g., a schema version indicator, in communication protocol messages generated towards another SIP entity as set forth below.

Figure 4:
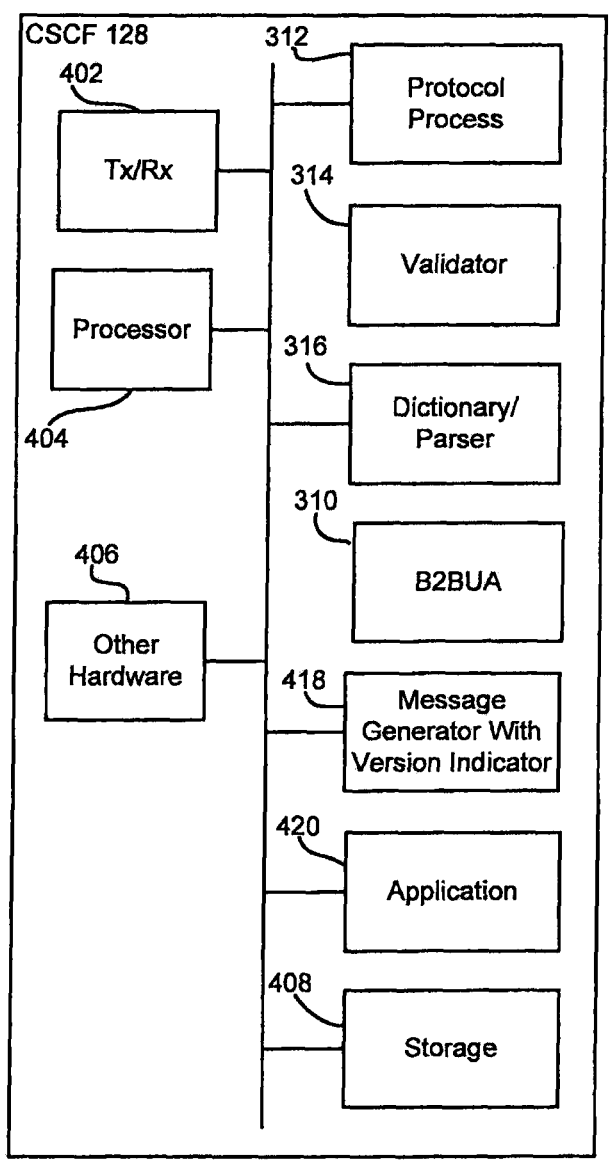
FIG. 4 is a schematic diagram illustrating a CSCF that is operable as a SIP entity that is capable of transacting XML message bodies.

FIG. 4 depicts a block diagram of CSCF 128 according to an embodiment that is operable as a SIP entity capable of transacting XML message bodies. By way of illustration, the embodiment of CSCF 128 is exemplary of any IMS infrastructure entity referred to hereinabove. One or more processing entities 404 are provided for the overall control of various processes executed by the CSCF 128 regardless of its architecture or proxy functionality. A suitable transmit/receive (Tx/Rx) block 402 is operable to send or receive various communication protocol messages having XML documents in the message bodies. A Back-to-Back User Agent (B2BUA) 410 is operable as a UAS or UAC with respect to a communication protocol process 412 such as a SIP process. A validator 414 is operable to validate XML documents, for example, received in a SIP message body from a sender or is capable of generating XML documents of one or more versions and possibly include a document version in the document. An application 420 is operable to execute or invoke suitable software based on the contents of the XML message documents. A dictionary and parser 416 may also be provided with respect to message parsing. A message generator 418 operable in conjunction with applicable protocol processes is included that is also capable of providing an indicator (e.g., a schema version indicator) in communication protocol messages generated towards another SIP entity as set forth below. Additional hardware 406 and local storage 408 is provided to facilitate other functions relating to managing and negotiating schema/document version information in message flows, potentially in both upstream and downstream directions of a communication path.

Figure 5:
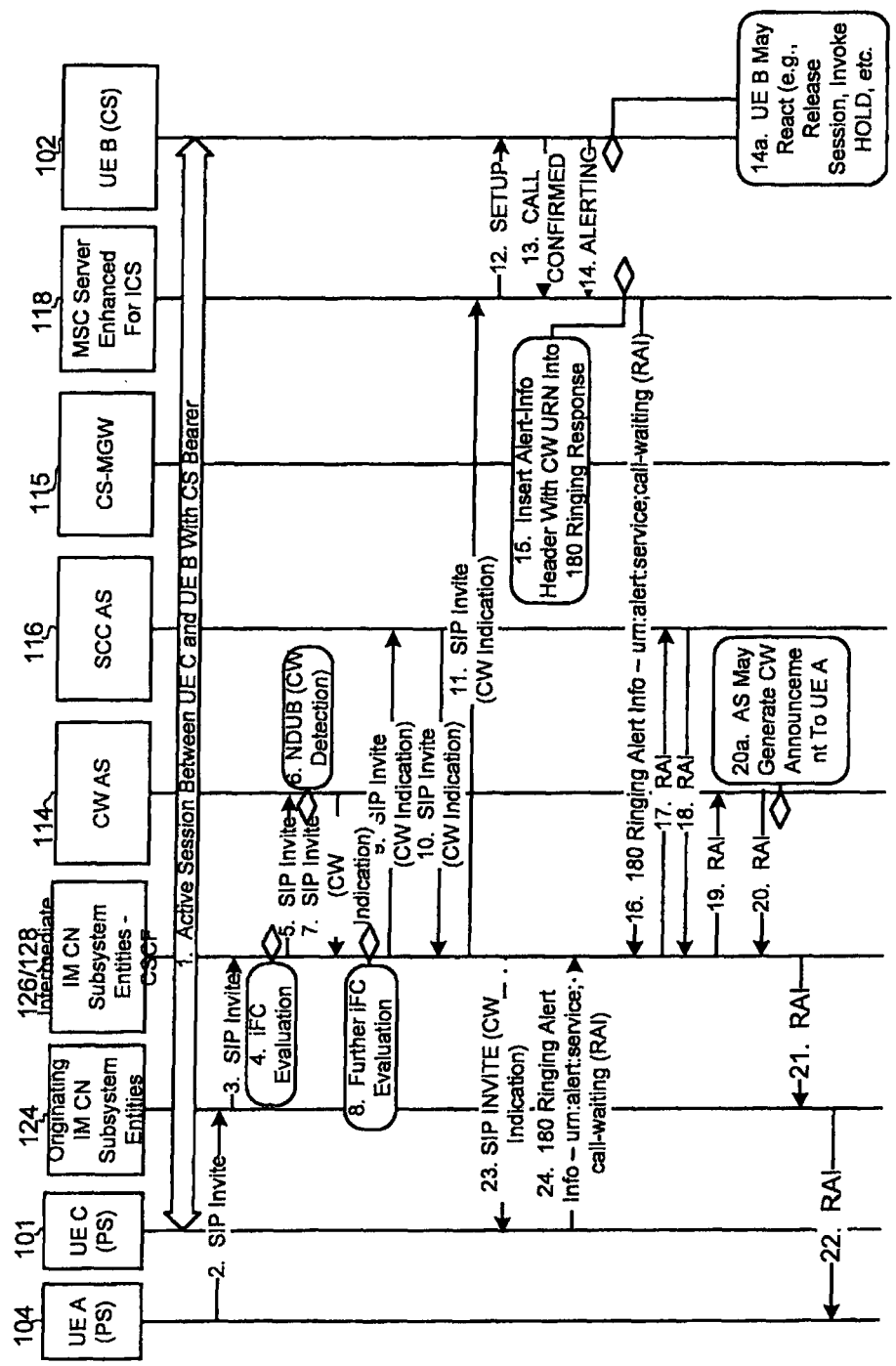
FIG. 5 is a diagram illustrating exemplary message flows among system components that is consistent with at least some aspects of the present invention.

Referring now to FIG. 5, exemplary message flows among the nodes described above with respect to FIG. 1 are illustrated for implementing a Communication Waiting service for CS network based UE B 102 when UE A 104 attempts to establish a communication session with UE B 102 using a PS network. To this end, each of UE C 101, UE B 102, UE A 104, enhanced MSC Server 118, CSCF SIP Server 128, CW AS 114 and SCC AS 116 as well as another UE C 101 are illustrated in FIG. 5. UE C 101 and UE A 104 may be hybrid UEs or CS UEs communicating with their (possible enhanced) MSC servers. Here, in the interest of simplifying this explanation each of UE A 104 and UE C 101 are shown as PS UEs. Communications or activities performed by nodes are consecutively labeled from 1 to 22. Initially, as indicated by double headed arrow 1, it is assumed that UE C 101 and CS network UE B 104 are participating in an active session where CS UE B 104 uses CS bearers for audio media. In addition it is initially assumed that, upon activation within a cell associated with GERAN/UTRAN 120 (see again FIG. 1), UE B 102 has previously registered a subscription profile that is accessible by other network nodes to identify communication services supported by UE B 102.

At 2, UE A 102 originates a SIP INVITE request in order to establish a communication session with UE B 104. The SIP INVITE request is provided to originating IM CN subsystem entities 124 (e.g., an originating core node) and is thereafter forwarded toward intermediate IM CN subsystem entities 126 (i.e., the CSCF 128) (see 3) in the terminating network in order to attempt to establish a session with CS UE B 102.

Continuing, at 4, the CSCF 128 applies initial Filter Criteria (iFC) to determine if the SIP INVITE should be provided to any application servers ASs (e.g., CW AS 114, SCC AS 116, etc.). As a result of the iFC evaluation, CSCF 128 forwards the SIP INVITE request to CW AS 114 at 5. At 6, CW AS 114 determines if UA B 102 is currently network determined user busy (NDUB). Here the term "busy" is used to refer to a condition in which the UE cannot receive the specific call associated with the current Sip INVITE. For instance, where a user can only participate in a maximum of two calls at a time, when a UE is currently participating in two calls, the UE is said to be busy. As another instance, were a UE cannot receive another call because of traffic congestion on the network, the UE may be considered busy. Other circumstances may constitute busy conditions. Where a UE is busy and cannot participate in the requested communication, CW AS 114 indicates the status to UE A 104.

TABLE 1

INVITE sip:user2_public2@home2.net SIP/2.0
Via: SIP/2.0/UDP scscf2.home2.net;branch=z9hG4bK332b33.1, SIP/2.0/UDP
    icscf2_s.home2.net;branch=z9hG4bK871y12.1, SIP/2.0/UDP scscf1.home1.net;branch=z9hG4bK332b23.1,
    SIP/2.0/UDP pcscf1.home1.net;branch=z9hG4bK431h23.1, SIP/2.0/UDP
    [5555::aaa:bbb:ccc:ddd]:1357;comp=sigcomp;branch=z9hG4bKnashds7

TABLE 1-continued

```
Max-Forwards: 70
Route: <sip:cwas2.home2.net;lr>, <sip:cb03a0s09a2sdfglkj490333@scscf2.home2.net;lr>;orig-dialog-
   id="O:73935718_92645110-712786jd246395302d-zKE"
Record-Route: <sip:scscf2.home2.net;lr>, <sip:scscf1.home1.net;lr>, <sip:pcscf1.home1.net;lr>
P-Access-Network-Info:
P-Asserted-Identity: "John Doe" <sip:user1_public1@home1.net>, <tel:+1-212-555-1111>
P-Charging-Vector: icid-value="AyretyU0dm+6O2lrT5tAFrbHLso=023551024"; orig-ioi=home1.net
P-Asserted-Service: urn:urn-xxx:3gpp-service.ims.icsi.mmtel
Accept-Contact: *;+g.3gpp.icsi_ref="urn%3Aurn-xxx%3gpp-service.ims.icsi.mmtel"
Privacy: none
From: <sip:user1_public1@home1.net>;tag=171828
To: <tel:+1-212-555-2222>
Call-ID: cb03a0s09a2sdfglkj490333
Cseq: 127 INVITE
Supported: 100rel, precondition, gruu
Contact: <sip:UE1@home1.net:gr=urn:uuid:f81d4fae-7dec-11d0-a765-00a0c91e6bf6>; +g.3gpp.icsi_ref="urn%3Aurn-
   xxx%3gpp-service.ims.icsi.mmtel">
Allow: INVITE, ACK, CANCEL, BYE, PRACK, UPDATE, REFER, MESSAGE
Accept: application/sdp, application/3gpp-ims+xml
Content-Type: multipart/mixed;boundary="boundary1"
Content-Length: (...)
--boundary1
Content-Type: application/sdp
...
a=
--boundary1
Content-Type: application/3gpp-ims+xml;sv="2"
Content-Disposition: 3gpp-alternative-service
<3gpp-ims version="2">
 <alternative-service>
  <type>
  <reason/>
  <action>
   <call-waiting-indication/>
  </action>
 </alternative-service>
</3gpp-ims>
--boundary1--
```

Where UE B 102 is not busy and therefore may receive another call, CW AS 114 inserts a CW indication into the SIP INVITE request as described in 3GPP TS 24.615. An exemplary abbreviated SIP INVITE request including an exemplary CW indication is shown in Table 1. In Table 1, the exemplary CW indication includes a Content-Type header field set to "application/3gpp-ims+xml" where the schemaversion (SV) parameter is set to "2", a Content-Disposition header field is set to "3gpp-alternative-service" and a MIME inserted into the body with a "call-waiting-indication" element contained in an "action" element, with the "action" element in turn contained in an "alternative-service" element and with the "alternative-service" element in turn contained in an "ims-3gpp" element.

While one CW indication is described in the preceding paragraph it should be appreciated that other CW indication types are contemplated. Thus, for instance, the sv parameter value may be set to some other value that indicates Communication Waiting, may be set to a recognizable character string, etc. In alternative embodiments the content-type header field value may be different in other ways. In yet other embodiments some other part of the message body or some other header field or header field value may indicate the Communication Waiting service. Here, the important point is that there has to be some CW indication added to the SIP INVITE that can be recognized by the MSC server 118 and PS domain UEs (e.g., UE C 101) as indicating that the Communication Waiting service should be interworked where a target UE supports the service. In the above example where the schemaversion or sv parameter value is set to include 2, it is assumed that the MSC server 118 is configured to recognize that when the schemaversion or sv parameter value is set to include 2 (e.g. sv=2), the setting indicates the desire to interwork the Communication Waiting related messages and indicators with the Call Waiting related messages and indicators. Similarly, if the UE B 102 was a hybrid UE receiving its Communication Waiting related messages and indicators over the PS network, presence of the schemaversion or sv parameter value is set to include 2 would enable a configured hybrid UE B 102 to determine that a communication waiting functionality is requested.

At 7 the SIP INVITE request with the inserted CW indication is sent back to the CSCF 128 where, at 8, additional iFC are applied to determine that the SIP INVITE should be sent to SCC AS 116. At 9 the SIP INVITE is forwarded to SCC AS 116 which determines that the SIP INVITE should be forwarded to enhanced MSC server 118 after which the SIP INVITE is sent back to CSCF 126 at 10. Continuing, at 11 the SIP INVITE with the CW indication is forwarded to enhanced MSC server 118.

Upon receipt of an initial SIP INVITE request the MSC server 118 may perform any of several different functions. First, where the MSC server 118 does not understand the one or more of the SIP message elements received (e.g., cannot handle media type application/3gpp-ims+xml with the schemaversion or sv parameter value is set to include 2 (i.e. application/3gpp-ims+xml;sv="2"), or a Content-Disposition header value set to 3gpp-alternative-service or the content-type header field value or the content-disposition header field value are received in an inappropriate 'context' (e.g. content-type header field value or the content-disposition header field value was only expected in other SIP requests or SIP responses received by other functional elements)) or the terminating UE B 102 does not support or is not subscribed for the Communication Waiting or call waiting service, MSC server 118 may simply generate a SIP 415 ((Unsupported Media Type) response or a 488 (Not acceptable here) response or a 606 (Not acceptable) response and send that response back (e.g. to the CW AS). If a UE is used that doesn't support the requested supplementary service interworking (e.g. call waiting) (e.g. due to a (U)SIM card swap) or if a subscription check fails, SIP responses 488 or 606 can be transmitted. Similarly, if the UE B 102 was a hybrid UE B receiving its Communication Waiting related messages and indicators over the PS network, and any of the conditions above would hold the hybrid UE B may simply generate a SIP 415 ((Unsupported Media Type) response and send that response back. If a UE is used that doesn't support the requested supplementary service interworking (e.g. call waiting) (e.g. due to a (U)SIM card swap), SIP responses 488 or 606 can be transmitted. Note that the CW AS would have to translate the 488 and 606 responses similarly as the 415 response is translated, by sending a BYE or CANCEL to the UE A 104. MSC server 118 could also respond with other SIP 3xx, 4xx, 5xx or 6xx responses to indicate to the CW AS that the interworking with call waiting has failed. Still, the CW AS will translate this response to SIP messages (e,g, BYE or CANCEL) a UE A 104 can handle knowing that UE A 104 may not realize that UE B 102 is determined to be NDUB or that for other reasons a Communication Waiting service has failed.

Second, where the SIP INVITE request media type includes SIP message elements that cannot be understood or are received out of context, such as a Content-Type header field set to media type "application/3gpp-ims+xml" with its schemaversion parameter set to "2"; the SIP INVITE request includes a MIME body part with the "call-waiting-indication" element contained in a "action" element, with that "action" element in turn contained in a "alternative-service" element, with that "alternative-service" element in turn contained in the "ims-3gpp" root element and is recognized and the enhanced MSC server 118 has calls for the UE B 102 only in states U10 (Active) or U26 (MO Modify) as defined in 3GPP TS 24.008, then MSC Server 118 may send a SETUP message (see communication 12 in FIG. 5) as described in 3GPP TS 29.292, sub-clause 5.4.3, where the SETUP message includes a "Signal Information" element with value #7 (i.e., call waiting tone on) (see communication 12 in FIG. 5).

In response to the SETUP message, UE B 102 presents a call waiting tone via UE B 102 to indicate to the user that a call is waiting. In response the UE B 102 user may simply not act on the call waiting tone or perform some action (see action 14a in FIG. 5) to accept the waiting call such as end the current active session with UE C 101, place UE C 101 on hold, etc. Where UE B 102 accepts the waiting call a CONNECT message is transmitted to MSC server 118 to indicate call acceptance. In this case MSC server 118 transmits a SIP 200 (OK) response to UE A 104 in accordance with 3GPP TS 29.292 sub-clause 5.4.9.

When UE B 102 indicates the waiting call (e,g, using the call waiting tone), a CALL CONFIRMED message (see communication 13 in FIG. 5) including a cause code #17 (i.e., indicating "user busy") (see communication 14 in FIG. 5) message is transmitted to MSC server 118. In response to the CALL CONFIRMED signal MSC server 118 sends a 180 (Ringing) response with an Alert-Info header field set to "urn:alert:service:call-waiting" to the initial SIP INVITE back to CSCF 128 (see action 15 and communication 16 in FIG. 5).

After communication 16, the SIP 180 (Ringing) response with an Alert-Info header field set to "urn:alert:service:call-waiting" is routed towards SCC AS 116 through CSCF 128. SCC AS 116 sends the SIP 180 (Ringing) response with the Alert-Info header field set to "urn:alert:service:call-waiting" towards the CW AS 114 (see communications 18 and 19). The SIP 180 (Ringing) response is forwarded through CSCF 128 and the originating IM CN 124 subsystem towards UE A 104 (see communications 20, 21 and 22). In FIG. 5, at 20a, CW AS 114 may generate a CW announcement to provide to UE A 104.

Thus, in the example above, MSC server 118 operates to translate a SIP INVITE including a Communication Waiting indication to a SETUP message including a communication waiting tone to be presented via UE B 102 and then operates to translate a user busy cause code #17 to a ringing SIP message that includes a call-waiting indicator to be delivered to the initiating UE A 104 and a Communication Waiting service is facilitated.

In cases where a SIP INVITE is generated by PS domain UE A 104 and is directed toward (hybrid) UE C 101 that is enabled to receive IMS messages over PS, referring again to FIG. 5, SCC AS 116 determines that the SIP INVITE including the CW indication should be forwarded directly to the UE C 101 instead of to a MSC server (possibly not shown in FIG. 5) corresponding to UE C 101 as shown by the dotted communication 23. Here, if the UE C 101 recognizes the SIP message elements indicating the network determined call waiting condition associated with the INVITE, UE C 101 can generate a SIP 180 (Ringing) response with the Alert-Info header field set to "urn:alert:service:call-waiting" and transmits the response towards the CW AS 114 (see communications 24, 17, 18 and 19). The SIP 180 (Ringing) response is forwarded through CSCF 128 and the originating IM CN 124 subsystem towards UE A 104 (see communications 20, 21 and 22). In the alternative, if UE C 101 does not recognize SIP message elements indicating the network determined call waiting condition (e.g. the media type associated with the body part indicating call waiting or other conditions as elaborated earlier) associated with the INVITE, UE C 101 generates a SIP 415 (Unsupported Media Type) response that is transmitted to the initiating UE A 104. A UE C 101 could also respond with other SIP 3xx, 4xx, 5xx or 6xx responses to indicate to the CW AS that the UE C 101 has failed to perform communication waiting procedures. The CW AS would have to translate these responses. If a SCC AS 116 or other node providing forking is involved, receipt of a 488 or comparable response may cause the selection mechanism, which selected the UE B 102 to select another UE and route the SIP INVITE to that UE. In such a case, the CW AS would still have to determine whether the NDUB condition was reached for that UE. Note that Application Servers and other nodes depicted are functional element that can be collocated.

Figure 6:
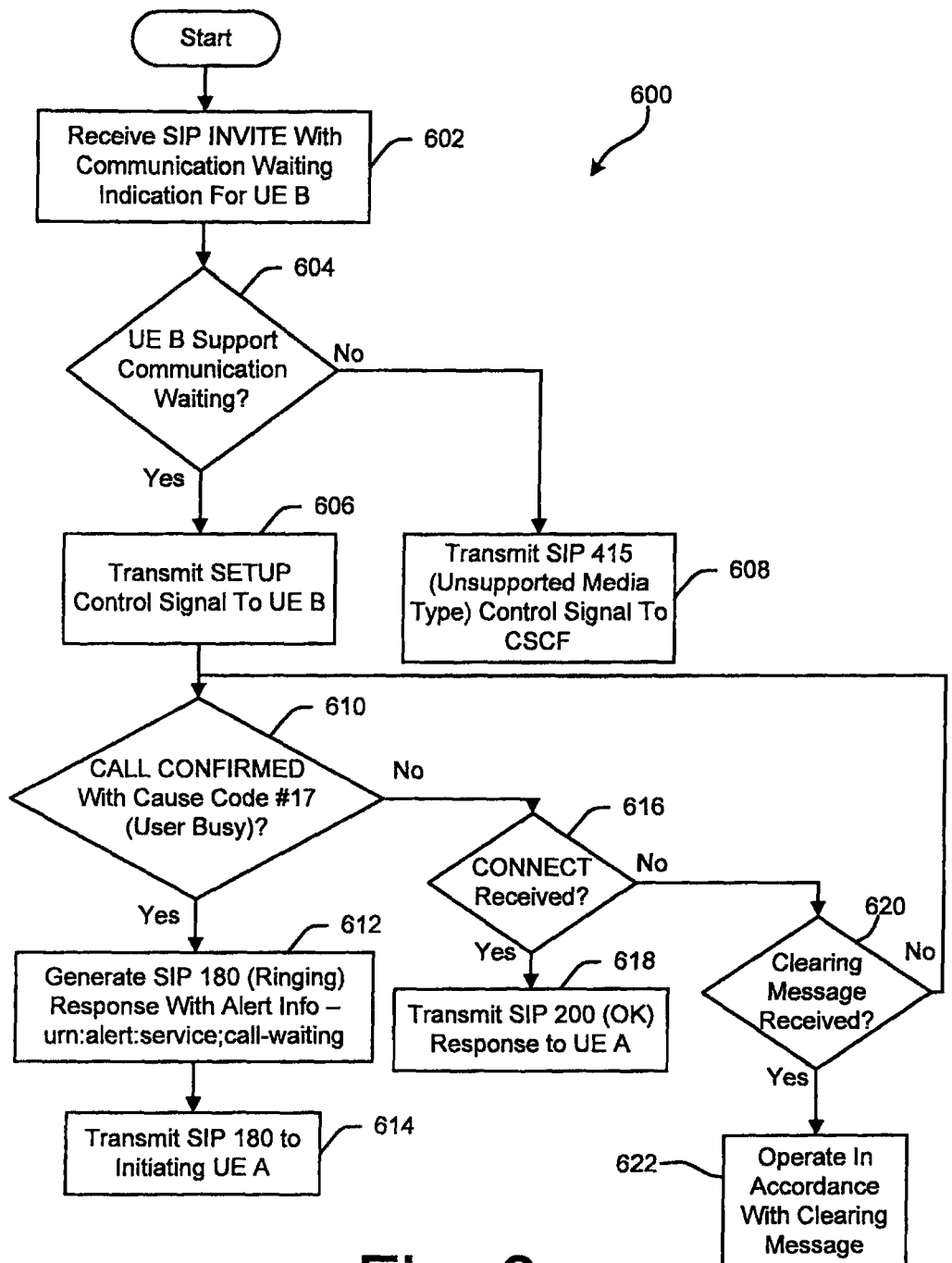
FIG. 6 is a flow chart illustrating operation of an MSC server to process a SIP INVITE.

Referring now to FIG. 6, a flowchart 600 is illustrated that shows exemplary operation of MSC server 118 to process a SIP INVITE including a Communication Waiting indication and to process responses from UE B as described above. To this end, at block 602 MSC server 118 receives a SIP INVITE including a CW indication that is directed toward UE B 102 (see communication 11 in FIG. 5). At decision block 604 MSC server 118 determines if UE B 102 supports the CW service in the manner described above. Where UE B 102 does not support the CW service, at block 608 a SIP error response (such as 415) is generated and transmitted to the CSCF. If UE B 102 signals it does not support the requested FACILITY or supplementary service, a SIP error response is also generated (such as 415 or 488).

Referring still to FIG. 6, at block 604, where UE B 102 supports the CW service, control passes to block 606 where MSC server 118 transmits the SETUP Control Signal to UE B 102 (see communication 12 in FIG. 5). Next, at block 610, MSC server 118 monitors for responses from UE B 102. When a CALL CONFIRMED message with a cause code #17 is received, MSC server 118 generates the SIP 180 Ringing response with alert information as described above and at block 614 the SIP 180 is transmitted to the initiating UE A 104. After block 614 control passes to block 616 where MSC server 118 monitors for a CONNECT message.

Referring again to block 610, where a CONNECT message is received, MSC server 118 transmits a SIP 200 (OK) response to UE A 102. At block 620, when a clearing message is received, control passes to block 122 where MSC server 118 causes the system to operate in accordance with the clearing message.

As discussed above, in other embodiments the step represented by block 604 may be eliminated so that a SETUP message is always presented to the UE B where the SETUP message includes some type CW indication. In this case, where UE B 102 is programmed to determine if the UE supports the CW service. Where the UE does not support the CW service, the UE would transmit a message akin to an unsupported message or message element received to the MSC server 118 which would in turn transmit a SIP error response (e.g., 415 or 488 or other) to the CSCF and onwards to the Application Server(s). Where the UE supports the CW service, control would pass to block 610 in FIG. 6 where the process described above would continue.

With respect to the (e.g. CW and CDIV) AS, in addition to mappings needed from e.g. a 415 to a BYE or CANCEL, a CW AS should be prepared for various timers to expire. A timer expiring (e.g. in the MSC Server enhanced for ICS) could result in sending a SIP error response or other SIP message towards the CW AS. For example, a 408 (Request Timeout) final response (e.g. with other header fields set to relevant values) could be received prior to expiry of any timers associated with service logic in the AS. The receipt of such an error message can be absorbed by an existing timer. When the existing timer subsequently expires, the AS only has to clear (e.g., by means of BYE or CANCEL) the SIP session or SIP dialog towards the user(s) for which no timer has expired.

Likewise, if on the other hand a timer in the AS expires, it is often advantageous if one or more or the UEs is informed of this event. In particular, in the event of a CW or CDIV timer expiring, the dialog(s) to the diverting user shall be terminated (e.g., by sending a CANCEL request or BYE request according to the rules and procedures in RFC 3261 including a Reason header field (see RFC 3326) with the protocol set to "SIP" and the cause set to "408"). Subsequently, the MSC server enhanced for ICS shall, upon receipt of a BYE or CANCEL request with a Reason header field (see RFC 3326) with the protocol set to "SIP" and the cause set to "408", send a the first clearing message according to sub-clause 5.4.8.2 in 3GPP TS 29.2929, with the following exception: the Cause information element shall be set to cause #102 "recovery on timer expiry".

With respect to the CDIV AS, the CDIV no answer timer may expire or behavior guarded by the no answer timer may be triggered by receipt of a 480 (Temporarily Unavailable). A 480 (Temporarily Unavailable) may be received from an MSC Server enhanced for ICS.

With respect to the call forwarding service, currently a functionality (or "Supplementary Service") exists if a user is unable or unwilling to answer a phone call on her/his UE when the UE announces the call via a ring tone. This functionality is referred to as "Call Forwarding on No Reply (CFNRy)" (see 3GPP TS 24.082) or more generally "call forwarding". Call forwarding allows a UE user to pre-set a functionality by which unanswered calls are forwarded to a given phone number, typically a voice mail service, another user's number, etc. However, an issue arises when a UE user is called and then subsequently, while the UE is ringing, decides not to answer the call, on a case-by-case basis. For instance, the called user may observe the identity of the calling person on a Caller Line Identity Presentation (CLIP) display and opt not to answer the call for some reason (e.g., the called user is currently participating in another call, the called user is busy in some other capacity, the called user simply does not want to field a call from the caller, etc.).

Here, if the called UE user decides to ignore a call, the called UE user has to wait until a 'No reply condition' timer period expires for her/his UE to stop ringing. The No reply condition timer defines the duration after which a non-answered call is forwarded to the pre-set number (see 3GPP TS 24.082). The value of this timer ranges from 5 to 30 seconds and is preset by a network operator and may be subsequently modified by the user for all calls. Nevertheless, when a UE ring persists to indicate an unwanted call, the ring is often bothersome.

Although the value of the No reply condition timer is configurable (e.g. by the mobile device user), decreasing the timer's value does not provide the answer to an unwanted bothersome ringing. To this end, the No reply condition timer represents a trade-off for general cases. For instance, the No reply condition timer is typically set to be "long enough" to give enough time for a called UE user to answer the call but it is also "short enough" to allow the call to be forwarded as soon as possible if there is to be no answer so that the caller will not give up without leaving a message and so that the bothersome ringing duration is minimized. Hence in this case a UE will keep ringing until the value of the pre-set "No reply condition" timer is reached (e.g. typically 20 seconds for the example of O2 networks).

One way to deal with unwanted calls quickly is to provide a UE function such that, when a call is received that a UE user does not want to answer at the time it is received, allows the user to select a button on the UE to forward the call to the call forwarding number prior to the end of a No reply condition timer duration thereby causing the UE to stop ringing. This function whereby the No reply condition timer duration is purposefully cut short is implemented on a case-by-case basis, depending on the current "human situation" of the called user at the time each call is received.

One problem with shortening the No reply condition timer duration and redirecting calls to the call forwarding number quickly is that the time duration before forwarding to voicemail or the like is often much shorter than the 'usual' No reply condition waiting time. Thus, in most cases a called UE user performs the button selection to forward a call to the voicemail service only a few seconds after a UE starts ringing. In this case, a caller often notices or perceives that the user called decided to not answer the specific call or caller. This type of call rejection can cause a caller to develop negative feelings regarding the called party's intentions (e.g., a feeling that the called person hung up on the caller).

There are various solutions to the problem described above that are used in various UE implementations today, such as the use of VIP callers' or 'VIP groups' where special ring tones or the like can be assigned to special callers or groups of callers. In addition special distinctive treatments may be ascribed to other callers such as always forwarding some callers to voice mail. Other special treatments are contemplated here. While all of these special treatments are useful, each of these solutions has a common limitation in that all of these treatments have to be decided and pre-set prior to being applied to calls/callers. Thus, special treatments cannot be modified on a case-by-case basis (e.g. for separate calls from a single caller) depending on the current situation of the called party when a UE is ringing.

One solution to the above problem is to provide a system wherein, a caller keeps hearing a ringing tone until the "No reply condition" timer has expired irrespective of whether or not the called user takes an action to ignore the call or silence the ring tones on the called user's UE. To this end, in at least some embodiments a "courtesy timer" could be defined on a communication network in addition to the No reply condition timer where the courtesy timer duration may be shorter or longer than the No reply condition timer duration. Here, after a special action such as selecting a call forwarding button on a called user's UE, the UE may simply stop generating the ring tone while the network simply continues to present the ring tone to the caller during the No reply condition timer duration or the courtesy timer duration, after which the network would redirect the call to the call forwarding number (e.g., voicemail).

Figure 7:
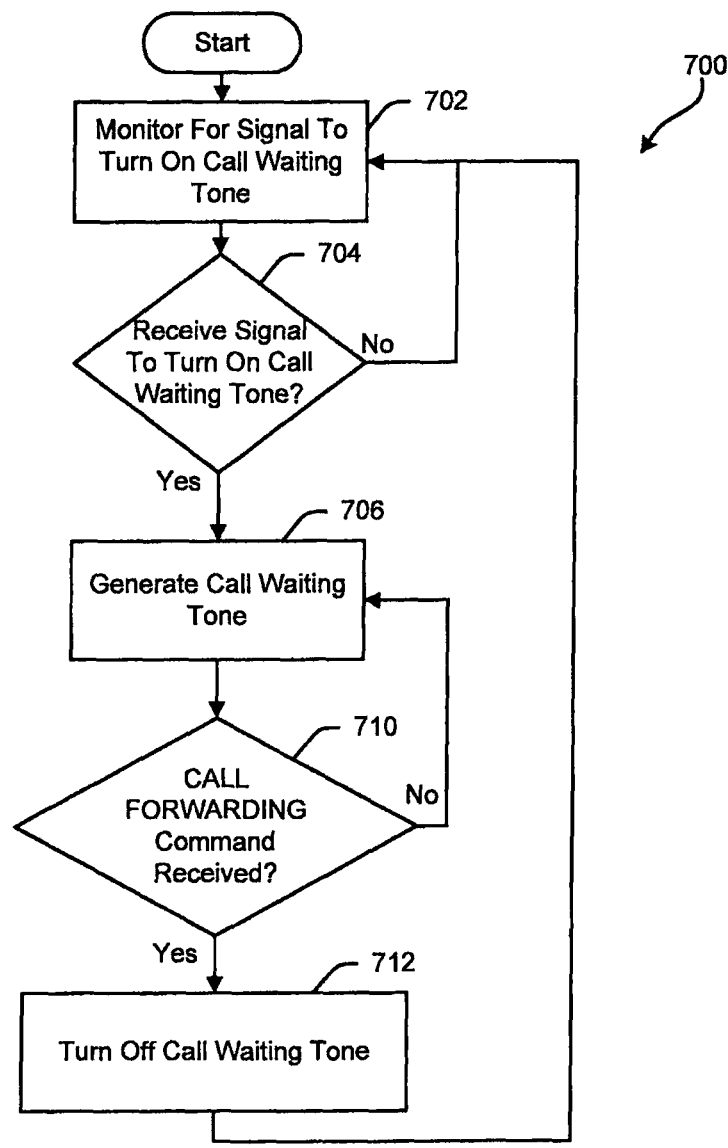
FIG. 7 is a flow chart that illustrates one method of implementing a call forwarding procedure.

During a call setup procedure (see 3GPP TS 24.008) the above process can be achieved as shown in FIG. 7 that illustrates one exemplary method 700 of a call forwarding feature. At block 702, a UE that receives a call via a communication network monitors for a signal to turn on a ringing tone. At decision block 704, when a tone turn on signal is received, control passes to block 706 where the UE generates the ringing tone and at block 710 the UE monitors for a call forwarding command or a clearing command or a connect command or a "silence" command from the UE user (i.e., selection of a call forwarding button associated with the command on the UE). Once a call forwarding command is received control passes to block 712 where the UE immediately turns off the ring tone after which control passes back up to block 702. As indicated above, in this example, when one of the buttons associated with a command (e.g. the button associated with the "silence" command) is selected via the UE, no signal is transmitted to the network node controlling the communication so that the node continues to process the communication as if the call forwarding button was not selected. Thus, the caller continues to hear the ring tone and perceives that the caller has not been actively ignored; the initiating user may experience the same or sufficiently similar behavior as if the UE's user wasn't near the UE. Here, the called device never sends a CONNECT message to the network (see 3GPP TS 24.008) and therefore the network does not enter the "active state" (.e. the call is "not accepted" by the called UE).

In other embodiments the command associated with the call forwarding button could also cause the UE to transmit either a SIP signal or a CS domain control signal to a network indicating that the call should be forwarded to a voice mail account at the end of a "No reply condition" timer duration that is monitored by one of the network nodes. Where the command includes a CS domain signal and a PS node supports the call forwarding service, the MSC server 118 (see again FIGS. 1 and 5) may receive the CS message, translate that message to a PS response and provide that response to the PS domain node to implement the call forwarding feature. Here, in some embodiments the UE may also immediately cease the ringing tone when the call forwarding button is selected.

In still other embodiments when a UE call forwarding button is selected, the UE may transmit a call forwarding message to the network thereby causing one of the network nodes to transmit a command to the UE to halt the CW tone and release the resources used to link to the UE. In any of these cases, the network node controlling the call forwarding period would time out a longer ring tone period for the caller so that the caller would perceive that the call was not purposefully sent to voicemail or some other secondary line.

In some embodiments it is contemplated that, instead of stopping the ring tone altogether when a UE user selects a button on a UE, a button selection could cause the UE to swap the ring tone with a different and more discrete ring tone. Here, the called user could opt to eventually answer the call if she/he changes her/his mind or her/his situation changes prior to the end of the 'No reply condition' timer duration. Thus, for instance, an initial ring tone may be quit loud while the second ring tone is relatively quieter, of a less bothersome nature, etc.

In still other embodiments it is contemplated that two or more of the above options may be presented to a UE user when a call is received. Thus, when a call is received and a ring tone is generated, a UE may display the following options via a display screen:

1—Accept.
2—Reject.
3—Ignore.
4—Wait.

Here, the Reject option may simply immediately forward a call to Voicemail, the Ignore option may immediately stop the ring tone on the called UE but cause the network to continue to present the ring tone to the caller until the No reply condition timer expires and the Wait option may cause a less bothersome ring tone to be swapped for an initial ring tone generated by the called UE.

In still other embodiments a UE may be programmed so that the UE only generates ring tones during a very short duration while the network transmits ring tones to a caller for a longer duration (e.g., for the duration of the "No reply condition" timer) automatically and without requiring the UE user to manually select a call forwarding button or the like. Here, while disturbances of the UE user would be minimal and of short duration, the caller would still perceive that the user did not purposefully avoid a call.

While call forwarding methods are described above in the context of ring tones, it should be appreciated that the same concepts are equally applicable to call waiting and communication waiting services where a UE user may desire to cut short the number of CW tones generated when a call is to be ignored without offending a caller.

The following describes at least one of the embodiments of this disclosure.

Receipt of Initial INVITE

Upon receipt of an initial INVITE request for a user involved in a call,
   if the initial INVITE request includes:
      a Content-Type header field set to media type "application/3gpp-ims+xml" with its "sv" or "schemaversion" parameter including "2";
   NOTE 1: if Communication Waiting media type "application/3gpp-ims+xml" with its "sv" or "schemaversion" parameter including "2" is not supported, the MSC Server responds with a 415 (Unsupported Media Type).
      a MIME body (part) according to sub-clause 4.4.1 of 3GPP TS 24.615 with the with the "call-waiting-indication" element contained in a "action" element, with that "action" element in turn contained in a "alternative-service" element, with that "alternative-service" element in turn contained in the "ims-3gpp" root element; and the MSC server enhanced for ICS has calls for the B-subscriber only in states U10 (Active) or U26 (MO Modify) as defined in 3GPP TS 24.008;

then, upon interworking the initial INVITE request to a SETUP message as described in sub-clause 5.4.3, the MSC Server shall apply the following additional interworking:

the MSC Server shall include a "Signal Information" element with value #7 (call waiting tone on); and the MSC Server shall store an indication that this session includes a CW AS;

otherwise:

if the subscriber's subscription does not allow for presentation of call waiting the MSC Server shall send a 486 (User Busy) response;

if the subscriber's subscription does allow for presentation of call waiting:

if the MSC Server determines that the incoming call can be presented to the subscriber as described in 3GPP TS 24.083[26] and the subscriber's call state does not allow presentation of the incoming call, the MSC Server shall send a 486 (User Busy) response;

otherwise, upon interworking the initial INVITE request to a SETUP message as described in sub-clause 5.4.3, the MSC Server shall apply the following additional interworking: the MSC Server shall include a "Signal Information" element with value #7 (call waiting tone on).

The MSC Server may start timer TUE-CW as described in 3GPP TS 24.615.

If the CALL CONFIRMED message received by the MSC Server during mobile terminating call setup contains a Cause information element set to a value of 17 (User busy), then upon interworking the subsequent ALERTING message to a 180 (Ringing) response as described in sub-clause 5.4.6, the MSC Server shall apply the following additional interworking:

the MSC Server may insert an Alert-Info header set to "urn:alert:service:call-waiting" as described in 3GPP TS 24.615 into the 180 (Ringing) response.

Accepting the waiting call

If the subscriber chooses to accept the waiting call and put the existing call on hold, the MSC Server shall:

stop timer TUE-CW if it was started;

upon receipt of the HOLD message for the existing call, apply the interworking specified in sub-clause 5.6.3.1.1 of 3GPP TS 29.292; and upon receipt of the CONNECT message for the waiting call, apply the interworking specified in sub-clause 5.4.9 of 3GPP TS 29.292;

If the subscriber chooses to accept the waiting call and release the existing call, the MSC Server shall:

stop timer TUE-CW if it was started;

upon receipt of the DISCONNECT message for the existing call, apply the interworking specified in sub-clause 5.5.2 of 3GPP TS 29.292; and upon receipt of the CONNECT message for the waiting call, apply the interworking specified in sub-clause 5.4.9 of 3GPP TS 29.292;

Rejecting the Waiting Call

If the MSC Server receives a first clearing message from the UE during call establishment, the cause value used towards the calling user as specified in 3GPP TS 24.008 shall be mapped to a final response to the INVITE request as specified in sub-clause 5.4.8.1 of 3GPP TS 29.292; except for cause codes:

19 (User alerting, no answer) and #18 (No user responding). A first clearing message from the UE during call establishment with cause code #19 (User alerting, no answer) or #18 (No user responding) shall be mapped to the 408 (Request Timeout) final response including a Reason header field (see RFC 3326 [z]) with the protocol set to "Q.850" and the cause set to "19" or "18" respectively;

63 (Service or option not available, unspecified) and #69 (Requested facility not implemented). If:

the MSC Server stored an indication that the session includes a CW AS, a first clearing message from the UE during call establishment with cause code #63 (Service or option not available, unspecified) or #69 (Requested facility not implemented) used towards the calling user as specified in 3GPP TS 24.008 shall be mapped to the 415 (Unsupported Media Type) final response; or the MSC Server did not store an indication that the session includes a CW AS, the cause codes #63 (Service or option not available, unspecified) and #69 (Requested facility not implemented) used towards the calling user as specified in 3GPP TS 24.008 shall be mapped to a final response to the INVITE request as specified in sub-clause 5.4.8.1 of 3GPP TS 29.292;

The MSC Server shall also stop timer TUE-CW if it was started.

Communication Release During Waiting Condition

Upon receipt of a BYE or CANCEL request for the waiting call, the MSC Server shall stop timer TUE-CW if it was started, and:

the BYE or CANCEL request includes a Reason header field (see RFC 3326) with the protocol set to "SIP" and the cause set to "408" then the MSC Server shall send a first clearing message according to sub-clause 5.4.8.2 of 3GPP TS 29.292; with the following addition:

the Cause information element shall be set to cause #102 "recovery on timer expiry";

otherwise, the MSC Server shall act in accordance with sub-clause 5.4.8.2 of 3GPP TS 29.292;

CW Condition Timeout

If timer TUE-CW was started and expires, the MSC Server shall send a DISCONNECT message to the UE for the waiting call and:

if the MSC Server stored an indication that the session includes a CW AS, send a 408 (Request Timeout) final response received including a Reason header field (see RFC 3326 [z]) with the protocol set to "Q.850" and the cause set to "19" to the initial INVITE request;

otherwise, the MSC Server shall act in accordance with sub-clause 5.4.8.2.

NOTE: Starting timer T2 or (optionally) T3 (or corresponding internal alerting supervision timing functions) is specified in 3GPP TS 24.083. Corresponding timers have been defined in 3GPP TS 24.615 and 3GPP TS 24.604. If timers T2 or optionally T3 are started and expire, any resulting SIP responses that are not a 408 (Request Timeout) final response received including a Reason header field (see RFC 3326) with the protocol set to "Q.850" and the cause set to "19", can interact with CW and (optionally) CDIV.

Notification to Originator

For originating calls interworked to the IM CN subsystem as described in sub-clause 5.3, if the MSC Server receives a 180 (Ringing) response with a Alert-Info header field set to "urn: alert:service:call-waiting" according to 3GPP TS 24.615, the MSC Server shall, according to 3GPP TS 24.083, sent if possible, the ALERTING message as the carrier message for the Call Waiting notification. Otherwise the FACILITY message shall be used.

The particular embodiments disclosed above are illustrative only, as the disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Thus, the disclosure is to cover all modifications, equivalents, and alternatives falling within the spirit and scope of the disclosure as defined by the following appended claims.

To apprise the public of the scope of this disclosure, the following claims are made:

What is claimed is:

1. A method for interworking a session by a Mobile Switching Center (MSC) server enhanced for IP Multimedia Subsystem (IMS) Centralized Services (ICS), the method comprising:
   receiving at the MSC server a Session Initiation Protocol (SIP) invite message for a user equipment (UE) involved in a call being served in a circuit switched (CS) domain by the MSC server, wherein the SIP invite message is received from an IMS network comprising a call waiting application server;
   when the SIP invite message comprises a MIME body including a communication-waiting indication element, the MSC server:
      sending to the UE a CS setup message comprising an information element indicating a call-waiting-tone-on, and
      storing an indication that the session includes a call waiting application server;
   receiving a CS message from the UE including call waiting information; and
   sending a SIP 4XX response message to the IMS network, the SIP 4XX response message including message information mapped from the call waiting information.

2. A method for interworking a session by a Mobile Switching Center (MSC) server enhanced for IP Multimedia Subsystem (IMS) Centralized Services (ICS), the method comprising:
   receiving at the MSC server a Session Initiation Protocol (SIP) invite message for a user equipment (UE) involved in a call being served in a circuit switched (CS) domain by the MSC server, wherein the SIP invite message is received from an IMS network comprising a call waiting application server;
   when the SIP invite message comprises a MIME body including a communication-waiting indication element, the MSC server:
      sending to the UE a CS setup message comprising an information element indicating a call-waiting-tone-on, and
      storing an indication that the session includes a call waiting application server;
   when a timer expires and the indication that the session includes a call waiting application server is stored in the MSC server, sending a SIP 4XX response message to the IMS network, the SIP 4XX response message including a Reason header field with a cause set to "19".

3. The method of claim 1, where said SIP 4XX response message is a final response prior to expiry of any timers associated with service logic in at least one of a Communication Waiting (CW) and a Communication Diversion (CDIV) application server.

4. A method for interworking a session by a Mobile Switching Center (MSC) server enhanced for IP Multimedia Subsystem (IMS) Centralized Services (ICS), the method comprising:
   receiving at the MSC server a Session Initiation Protocol (SIP) invite message for a user equipment (UE) involved in a call being served in a circuit switched (CS) domain by the MSC server, wherein the SIP invite message is received from an IMS network comprising a call waiting application server;
   when the SIP invite message comprises a MIME body including a communication-waiting indication element, the MSC server:
      sending to the UE a CS setup message comprising an information element indicating a call-waiting-tone-on, and
      storing an indication that the session includes a call waiting application server;
   receiving a request with a Reason header field with the protocol set to "SIP" and the cause set to "408"; and
   sending a first clearing message with the Cause information element set to cause #102.

5. An apparatus for interworking a session by a Mobile Switching Center (MSC) server enhanced for IP Multimedia Subsystem (IMS) Centralized Services (ICS), the apparatus comprising:
   an MSC server configured to:
      receive a Session Initiation Protocol (SIP) invite message for a user equipment (UE) involved in a call being served in a circuit switched (CS) domain by the MSC server, wherein the SIP invite message is received from an IMS network comprising a call waiting application server;
      when the SIP invite message comprises a MIME body including a communication-waiting indication element:
         send to the UE a CS setup message comprising an information element indicating a call-waiting-tone-on;
      receive a CS message from the UE including call waiting information; and
      send a SIP 4XX response message to the IMS network, the SIP 4XX response message including message information mapped from the call waiting information.

6. An apparatus for interworking a session by a Mobile Switching Center (MSC) server enhanced for IP Multimedia Subsystem (IMS) Centralized Services (ICS), the apparatus comprising:
   an MSC server configured to:
      receive a Session Initiation Protocol (SIP) invite message for a user equipment (UE) involved in a call being served in a circuit switched (CS) domain by the MSC server, wherein the SIP invite message is received from an IMS network comprising a call waiting application server;
      when the SIP invite message comprises a MIME body including a communication-waiting indication element:
         send to the UE a CS setup message comprising an information element indicating a call-waiting-tone-on, and store an indication that the session includes a call waiting application server;

when a timer expires and the indication that the session includes a call waiting application server is stored in the MSC server, send a SIP 4XX response message to the IMS network, the SIP 4XX response message including a Reason header field with a cause set to "19".

7. The apparatus of claim 6, where said SIP 4XX response is a final response prior to expiry of any timers associated with service logic in at least one of a Communication Waiting (CW) and a Communication Diversion (CDIV) application server.

8. An apparatus for interworking a session by a Mobile Switching Center (MSC) server enhanced for IP Multimedia Subsystem (IMS) Centralized Services (ICS), the apparatus comprising:

an MSC server configured to:
receive a Session Initiation Protocol (SIP) invite message for a user equipment (UE) involved in a call being served in a circuit switched (CS) domain by the MSC server, wherein the SIP invite message is received from an IMS network comprising a call waiting application server;

when the SIP invite message comprises a MIME body including a communication-waiting indication element, the MSC:
send to the UE a CS setup message comprising an information element indicating a call-waiting-tone-on, and
store an indication that the session includes a call waiting application server;
receive a request with a Reason header field with the protocol set to "SIP" and the cause set to "408"; and
send a first clearing message with the Cause information element set to cause #102.

9. The apparatus of claim 5, wherein the MSC server is configured to:
when the SIP invite message comprises a MIME body including a communication-waiting indication element, store an indication that the session includes a call waiting application server.

\* \* \* \* \*